Feb. 11, 1936.　　　　O. A. ROSS　　　　2,030,542
HEATING SYSTEM
Original Filed Sept. 14, 1925
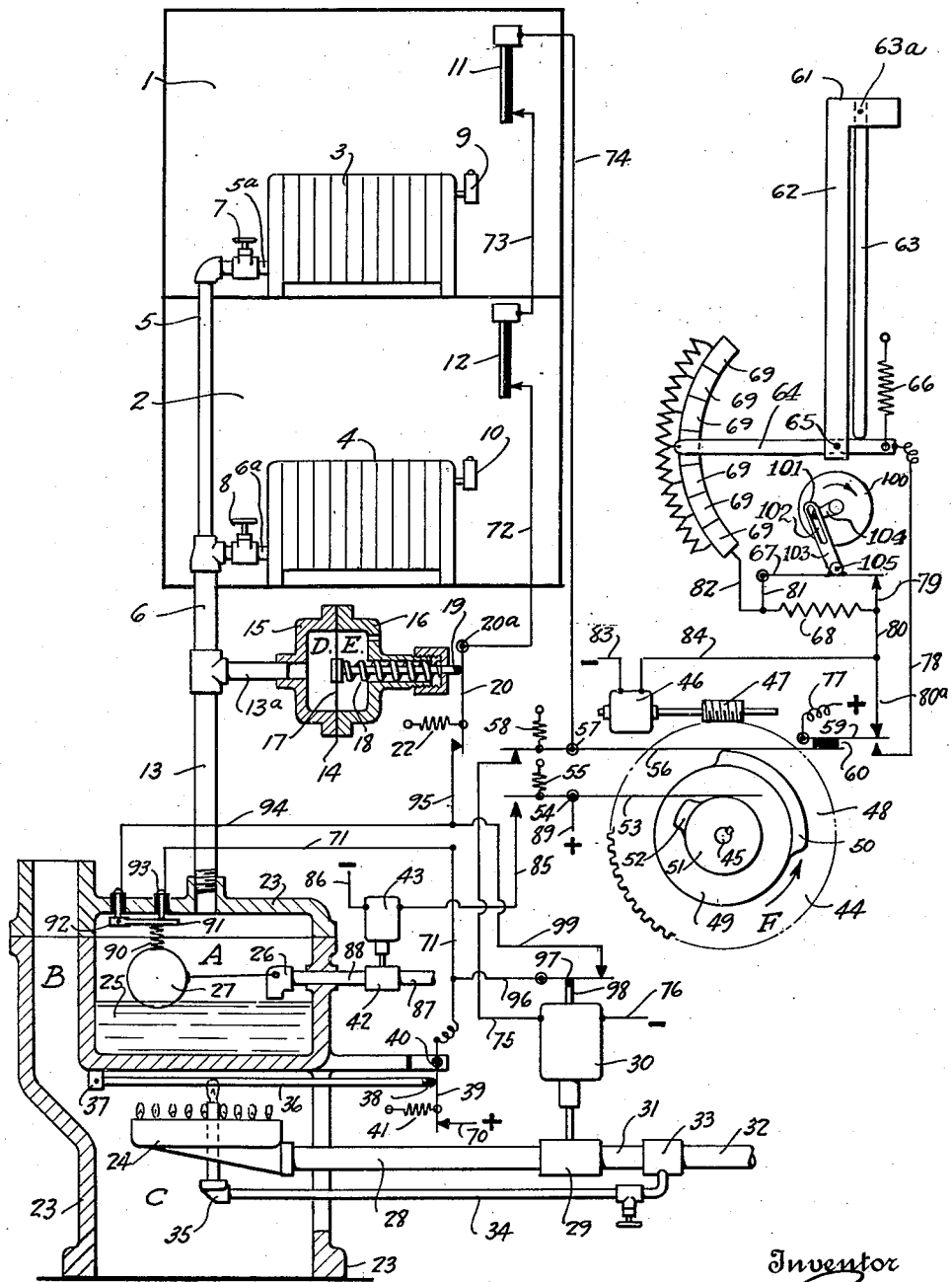
Inventor
Oscar A. Ross Patented Feb. 11, 1936

2,030,542

UNITED STATES PATENT OFFICE 2,030,542

HEATING SYSTEM

Oscar A. Ross, New York, N. Y.

Continuation of application Serial No. 56,283, September 14, 1925. This application February 14, 1931, Serial No. 515,761

42 Claims. (Cl. 236—91)

This invention relates to heating systems and systems of control therefor and more particularly to steam heating systems such for example as adapted for large office and apartment buildings.

One object of this system in a preferred form is to furnish a fully automatic heating system for buildings, even to the extent if desired, of automatically controlling the quantity of liquid in the heating boiler, as well as the fuel supplied thereto for generating the steam therein.

Another object is to prevent the over-heating of spaces heated by the steam. In systems employing a thermostat to cut off the steam supply upon a predetermined rise in the room temperature, the remaining heat in the radiators after the heat supply has been cut off may act to cause over heating of the rooms or spaces, more especially in milder weather. In my system the quantity of steam or heating fluid supplied to the spaces is preferably made substantially in proportion to the temperature of the outside atmosphere. Furthermore the steam is preferably supplied in cycles, the frequency of which may, for example, be made in proportion to the temperature of the outside atmosphere. During each cycle the steam is quickly supplied to the system whereby the entire system may be completely filled during such cycle. Such a system has several advantages. By supplying steam in proportion to the outside temperature, the waste of heat may be minimized. For example, if a window is left open on a cold day with the conventional type of room thermostat control, the steam is continually supplied to the radiator thereby wasting steam. With my system however, when a window is open, no more than the allotted quantity of steam corresponding to the prevailing outside temperature will be supplied to the room. Furthermore by supplying the steam in cycles quickly to the system all the radiators may if desired become filled thereby uniformly heating the building, whereas if the steam is slowly supplied to the system, as is required in the usual heating system during milder weather, only the radiators adjacent the boiler become filled with steam. This is especially so in large buildings where long risers are employed between the boiler and the radiators.

Another object of a preferred form of the system is to provide an arrangement wherein, should the means normally controlling the steam supply fail to properly shut off the steam, means are furnished to cut off the supply upon an abnormal increase in temperature within the spaces heated.

Another object is to furnish a heating system wherein the quantity of steam supplied to the system is not only varied in proportion to the temperature of the outside atmosphere, but also the steam supply may be further adjusted according to the periods of occupancy and unoccupancy whereby, for example, during the night a lower but uniform temperature may be maintained in the spaces heated by the system.

Various further and more specific objects, features and advantages will clearly appear from the detailed description given below, taken in connection with the accompanying drawing forming a part of this specification and illustrating by way of example only one embodiment of the invention. The invention consists in such novel features, arrangements, combinations of parts and methods as are described in connection with the apparatus herein disclosed and set forth in the appended claims.

The drawing comprises a diagrammatic view of one form of the invention including a source of electrical energy indicated by the usual plus and minus signs, and in which 1 and 2, are spaces to be heated containing radiators 3 and 4, connected to pipes 5 and 6 through connections 5a and 6a, and valves 7 and 8, the radiators also having air valves 9 and 10. Spaces 1 and 2 also contain thermostats 11 and 12 which are acted upon by the rise and fall of the temperature within said spaces.

Pipe 6, may be provided with a branch 13a terminating in pressure regulating device 14, comprising housing members 15 and 16, having diaphragm 17 clamped therebetween, the center of which abuts spring 18, also carrying rod 19, the outer end of which engages a contact bar, or lever 20, pivoted at 20a, and restrained by spring 22.

A heater 23 comprises reservoir A into which a liquid as 25 to be vaporized is fed through valve 26, the opening of which is controlled by float 27, said float in its raised position also serving to compress spring 90 attached to contact lever 91 hinged to insulated post 92, in this manner closing a circuit to insulated post 93. The heater 23 also comprises a chamber or fire-pot C having an exhaust outlet B for burner 24 receiving fuel from pipe 28 having valve 29 operated by electro-magnet 30. Pipes 31, 32 and fitting 33 form part of the fuel line, fitting 33 continuing in pipe 34 to pilot light 35.

One end of a thermostat bar 36 is secured to the heater housing by pin 37 and the outer end thereof supports insulated portion 38 arranged to actuate contact lever 39, pivoted to an insulated portion of the heater housing by pin 40, lever 39 being restrained by spring 41.

Liquid supplied to the chamber A through valve 26 may also be controlled by a valve 42 actuated by electro-magnet 43.

A time interval device 44, rotating on shaft 45, is actuated by gear 48 driven by worm 47, mounted on the shaft of motor 46, and comprises drum 49, having sector 50, adapted to actuate contact lever 56, around its pivot 57, also drum 51, having sector 52 adapted to actuate contact lever 53 around its pivot 54, spring 58 being adapted to hold contact lever 56 in contact with the periphery of drum 49, or sector 50 and spring 55, likewise being adapted to hold contact lever 53 in contact with the periphery of drum 51, or sector 52.

A thermostatic device 61 positioned in the outside atmosphere comprises low temperature coefficient frame 62 having high temperature coefficient rod 63, one end of which is rigidly secured by pin 63a, and the other end of which engages a contact lever 64, pivoted at 65, one end of said lever contacting with rheostat terminals 69—69 and the other end thereof being restrained by spring 66. A switch 67 may be manually operated, or may be automatically operated by suitable clock mechanism.

In the drawing the parts are in position to illustrate the beginning of a heating cycle. Time interval device 44 has rotated drums 49 and 51 to a position where contact lever 56 has been actuated by sector 50 to close a circuit as follows:—From positive energy to wire 70, contact lever 39, wire 71, contact post 93, contact lever 91, post 92, wires 94, 95, lever 20, wire 72, thermostat 12, wire 73, thermostat 11, wire 74, lever 56, wire 75, electro-magnet 30 and wire 76 to negative energy.

Assuming that the hot liquid in chamber A is sufficient to raise float 27, and through spring 90 restrain lever 91 against post 93, the magnet 30 will be energized to actuate magnet valve 29 whereby fuel will flow to burner 24 and be ignited by pilot light 35, in this manner converting liquid 25 into steam, or vapor which flows in pipes 13, 6, 6a, 5, 5a to radiators 3 and 4 thereby heating spaces 1 and 2.

Under normal conditions the thermostats 11 and 12 do not operate to effect change in the operation of the system. However upon abnormal increase of temperature in said spaces, due, for example, to the failure of some part of the control system, either one or both of said thermostats may operate to open the above described circuit, preferably termed the "main control circuit". A continually closed position of contact lever 56, thereby causing a continual boiling of the liquid in chamber A, would constitute such a failure.

The main control circuit is established during the period of time that the lever 56 is elevated by sector 50, said period of time being preferably sufficiently long to produce a quantity of steam sufficient to fill all the radiators of the system as well as maintain said radiators filled for a predetermined period of time before said circuit is opened by device 44.

If for any reason, during the establishment of the main control circuit, the steam pressure in the system becomes too high, with the danger of bursting the radiators connected thereto, diaphragm 17 of device 14 will be moved towards space E thereby actuating contact lever 20 to open said circuit whereby electro-magnet 30 is deenergized and valve 29 closed to extinguish burner 24. Said circuit will remain open, even though lever 56 may be in the raised position, until the pressure in said system has been restored to normal, whereupon lever 20 again either partially or wholly establishes said circuit depending upon the position of lever 56. Such reestablishment of said circuit is also dependent upon the thermostats 11 and/or 12 which may also have opened during the period of excess pressure, and the resulting excess heat generated in spaces 1 and 2. The reestablishment of said circuit will be further dependent upon the partial establishment thereof by contact lever 91, the closing of said lever being also dependent upon the level of the liquid in chamber A. For example, if the steam in the system has not condensed sufficiently to produce enough liquid to raise float 27, or the valve 42 has failed to function when electro-magnet 43 is energized by the actuating of lever 53 by cam 52, for replenishing the liquid in chamber A, contact lever 91 will not be raised and therefore said main control circuit will not be established thereby.

With the main control circuit energized normally, that portion of said circuit through wire 71, posts 92 and 93 and lever 91, is shunted by wire 96, contact lever 97, operated by rod 98 and wire 99, said rod 98 being actuated by the armature of magnet 30. With the aforesaid shunt circuit established, the lowering of lever 91 by float 27, due to the lowering of the liquid level in chamber A will not have the effect of opening said main control circuit.

The frequency of the heat supply periods for maintaining a substantially uniform temperature in spaces 1 and 2, for a given outside temperature, will depend upon the insulation of the enclosure surrounding said spaces. With these factors known, the system comprehends the varying of the frequency of the heating cycles, or supply periods substantially in proportion to the variation in temperature of the outside atmosphere. This is accomplished by the following described circuit:—

*Temperature control circuit*

This circuit is established during the period when lever 56 is disengaged from cam 50 whereupon lever 59 establishes a circuit through a wire 78. The circuit is as follows:—From positive energy to wire 77, lever 59 in lowered position, wire 78, rheostat arm 64, rheostat sections 69—69, wires 81 and 82, switch 67 in closed position, wires 79, 80 and 84 to motor 46 and thence to negative energy through wire 83. It will be noted that during this so-called non-heating period of the heating cycle, the motor 46 is regulated in speed by the number of rheostat contacts, as 69—69 in series with said motor. Thermostatic device 61 is positioned in the outside atmosphere and when the weather is cold, rod 63 will contract whereby spring 66 will act to reduce the number of said sections 69 in series with said motor, thereby increasing the speed of said motor whereby the time interval of the non-heating periods are shortened thus increasing the frequency of the heating periods. On the other hand, if the outside temperature is high due to milder weather, rod 63 will elongate thereby cutting in one or more of said sections 69, thereby reducing the speed of said motor and increasing the time interval of the non-heating periods, or decreasing the frequency of the heating cycles.

As the fuel flowing to burner 24, the quantity of liquid in chamber A, and the amount of steam required to adequately fill the radiators, as at 3 and 4, are substantially constant factors, the heat supply periods of each cycle may be substantially fixed time intervals. This is accomplished in the following manner:—

*Heat supply period motor circuit*

This circuit is formed when cam 50 raises contact lever 56 whereby lever 59 establishes a circuit to wire 80a as follows:—From positive energy to wire 77, lever 59, wires 80a and 84 to motor 46, thence to wire 83 to negative energy. This circuit remains established during the period cam 50 engages lever 56, and, as the resistance of this circuit normally is non-variable, motor 46 will operate at substantially constant speed during the heat supply period of all the heating cycles and during which period the main control circuit is also established by lever 56.

Replenishing liquid to chamber A is supplied thereto only during the final portion of the non-heat supply periods whereby all the condensation will have ample time to return to said chamber. This is accomplished by the following circuit:—

*Heating liquid supply circuit*

This circuit is formed when cam 52 raises lever 53 to engage with wire 85. The circuit is as follows:—From positive energy to wire 89, contact lever 53, wire 85, magnet coil 43, wire 86 to negative energy. The energizing of magnet coil 43 actuates valve 42 whereby replenishing liquid may flow from supply pipe 87 through valve 42, pipe 88 and float valve 26 to chamber A, this flow occurring only if the level of the liquid 25 in said chamber has lowered float 27 sufficiently to open valve 26. Supply pipe 87, preferably receives the liquid from a pre-heater whereby the temperature of the replenishing liquid will be at substantially the boiling point thereof when entering said chamber A.

The action of cam 52 just precedes that of cam 50, in this manner permitting substantially all the condensation to return to chamber A before liquid replenishing valve is opened by cam 52.

The establishment of the main control circuit is also dependent upon the burning of the pilot light 35 in the following manner:—As long as said pilot light is burning, thermostatic rod 36 acts to effect engagement of lever 29 with wire 70, in this manner partially establishing said main control circuit, whereas if said pilot light becomes extinguished, said rod will contract and act to open said circuit through lever 29.

During periods when normal heat supply is not required, as for example at night, the switch 67 is opened thereby introducing a resistance 68 in series with motor 46 during the non-heating period of the cycle, this resistance being additional to the amount of resistance inserted by the thermostatic device 61, in this manner maintaining a subnormal but substantially constant temperature in spaces 1 and 2 irrespective of the variation of the temperature of the outside atmosphere. The switch 67 may be operated from a chronometer device 100, having arm 104, supporting pin 101 operating in slot 102 of lever 103 pivotally secured to lever 67 by pin 105. Said arm 100 rotates once every 24 hours, the pin 101 engaging the upper end of slot 102 to raise lever 67 for reducing the heating at night as arm 104 moves through the upper portion of its travel. The length of lever 103 may be varied, or the radius of location of pin 101 may be varied for relatively varying the day and night periods of heating.

This application is a continuation of my application Serial Number 56,283, filed September 14th, 1925.

In the following claims it will be understood that the expressions "varying the heat supply periods substantially in accordance with variations in the outside temperature" and the like, are intended to refer to the fact that the heat is supplied substantially in accordance with the requirements as determined by outdoor temperature variations; that is, on a decrease in outdoor temperature more heat is supplied, but upon a corresponding increase in outdoor temperature, substantially a corresponding lesser amount of heat is supplied.

In my copending application Ser. No. 233,482, filed November 15, 1927, certain features of this invention are disclosed and methods of practicing the same are claimed; and in said application and also a copending divisional application thereof, Ser. No. 757,790, filed December 17, 1934, certain other embodiments and improvements of the invention are disclosed and claimed. Said applications also disclose the invention as applied to the control of the steam supplied to buildings using a public utility service steam main as the steam source.

While the invention has been described with respect to a certain particular preferred example which gives satisfactory results, it will be understood by those skilled in the art, after understanding the invention, that various changes and modifications may be made without departing from the spirit and scope of the invention, and it is intended therefore in the appended claims to cover all such changes and modifications.

What I claim is:—

1. A steam generator, a fuel burner therefor having a fuel supply connected thereto, means for controlling the supply of fuel to the burner from the fuel supply means, ignition means for igniting the fuel at the burner, a time interval device for rendering the fuel control means effective to supply fuel to the burner, and means controlled by the ignition means for annulling the control of the fuel supply means by the time interval device.

2. The combination with one or more enclosed spaces arranged to be heated by a steam heating system, of a steam generator for producing steam to be supplied to the system, a fuel burner therefor having a fuel supply connected thereto, means for controlling the supply of the fuel from the supply means to the burner, time interval means for controlling the fuel supply control means, and means controlled by the pressure of the steam in the system for rendering the time interval means ineffective to control the fuel supply control means upon a predetermined increase of the pressure therein.

3. The combination with one or more enclosed spaces arranged to be heated by a steam heating system, the temperature of which is affected by the variation in temperature of the outside atmosphere, of a steam generator for producing steam to be supplied to the system, a fuel burner therefor having a fuel supply connected thereto, means for controlling the supply of the fuel from the supply means to the burner, time interval means for controlling the fuel supply control means, means affected by the variation in temperature of the outside atmosphere for controlling the time interval means, and means controlled by the pressure of the steam in the system for rendering the time interval control means ineffective to control the fuel supply control means upon a predetermined increase of pressure of the steam therein.

4. In a heat regulating system, one or more spaces to be heated, a source of heat therefor, means for controlling the supply of the heat from the source to the spaces, and time interval means for rendering said control means effective to supply heat to the spaces for substantially fixed intervals of time alternately with cancelling the supply thereto for variable intervals of time.

5. In a heat regulating system, one or more spaces to be heated, a heating system therefor, a vaporizing chamber for supplying heated vapors thereto, means for heating the chamber for producing heated vapors therein, means for supplying liquid to the chamber to be vaporized therein, time interval means for rendering the heating means effective to heat the chamber periodically, and means controlled by the time interval means for rendering the liquid supply means ineffective to supply the liquid to the chamber during the period the heating means is rendered effective to heat the chamber.

6. In a heat regulating system, one or more spaces to be heated, a heating system therefor, a chamber having a source of liquid connected thereto for supplying heated vapors to the system, a heater for heating the chamber to produce heated vapors therein, means for controlling the supply of energy to the heater, time interval means for controlling the energy supply control means, means controlled by the level of the liquid in the chamber for controlling the supply of liquid from the source thereto, means controlled by the liquid level control means for controlling the time interval means, and means dependent upon the energization of the energy supply control means for rendering the liquid level control means ineffective to control the time interval means.

7. In a heat regulating system, one or more spaces to be heated, a heating system therefor, a chamber for supplying heated vapors to the system, means for controlling the supply of heated vapors from the chamber to the system, means for heating the chamber for producing the heated vapors therein, a source of liquid connected to the chamber, means for controlling the supply of the liquid from the source to the chamber, time interval means for jointly controlling the heated vapor supply control means and the liquid supply control means whereby the heated vapor supply control means is rendered effective to cause heating of the chamber alternately with rendering the liquid supply control means effective to supply liquid to the chamber.

8. In a heat regulating system with one or more spaces to be heated, a source of heat for heating the spaces, means for controlling the supply of heat from the source to the spaces, and time interval means for rendering the heat supply control means effective to supply heat from the source to the spaces for periods having substantially fixed intervals of time alternately with cancelling the heat supply thereto for periods having variable time intervals.

9. A heating system comprising, a vapor generator, a fuel burner therefor having a fuel supply thereto, means for controlling the supply of the fuel to the burner including a time interval device for controlling the fuel supply during spaced intervals of supply and means controlled by the temperature of space other than that heated by the heat generator for controlling the time interval device.

10. A heating system comprising, a vapor generator, a fuel burner having a fuel supply thereto, means for controlling the fuel supply to the burner including a time interval device for intermittently checking and releasing the fuel supply, and means controlled by the temperature of space other than that heated by the vapor from the generator for controlling the time interval device.

11. A heating system comprising, a vapor generator, a fuel burner therefor having a fuel supply thereto, means for controlling the supply of the fuel to the burner including a time interval device for intermittently checking and releasing the fuel supply, in cycles normally of substantially a fixed duration for a given outdoor temperature, and means dependent for action on the variation of the outside atmospheric temperature for controlling the time interval device.

12. A heating system comprising, a vapor generator, a fuel burner having a fuel supply thereto, means for controlling the supply of the fuel to the burner, a time interval device, means controlled thereby for furnishing a substantially fixed time interval for controlling the fuel supply control means during each cycle of operation of said control means, and means dependent upon the rise and fall of atmospheric temperature of space other than that heated by the vapors of the heat generator for determining the frequency of the cycles of operation of the fuel supply control means.

13. A heating system comprising, a vapor generator, a fuel burner therefor having a fuel supply thereto, means for controlling the supply of fuel to the burner, a time interval device, means controlled thereby for controlling the fuel supply control means during spaced periods of time, and means dependent upon the rise and fall of atmospheric temperature of space other than that heated by the heat generator for determining the lengths of the intervals between said periods.

14. A heat regulating system comprising, a heating system, a source of heat therefor, means for controlling the supply of heat from the source to the system, a time interval device, means operated thereby for controlling the heat supply control means during spaced heating periods, means dependent upon the rise and fall of atmospheric temperature of space other than that heated by the system for normally determining the frequency of said periods, and means affecting the normal frequency determining means for effecting the heating periods at a frequency which are a multiple of the normal frequency.

15. A heating system comprising, one or more spaces to be heated, a source of heat therefor, means controlling the heat supplied to the spaces from the source for producing a substantially fixed quantity of heat in the spaces at spaced intervals, and temperature controlled means located in space other than the heating spaces for determining the time spacing of the intervals.

16. A heat regulating system comprising, one or more spaces to be heated, a source of heat for heating the spaces, means for rendering the source effective to heat the spaces for substantially fixed periods of time, and means affected by the variations in temperature of elements exterior to the spaces for decreasing the frequency of the periods upon an increase in the temperature of the elements and increasing the frequency upon a decrease of their temperature.

17. In a heat regulation system, a source of heat arranged to heat one or more elements, time interval apparatus for rendering the source effective to heat the elements in periodic cycles, a motor for driving the apparatus, means controlled by the apparatus for determining the speed of the motor during one portion of the cycles and temperature controlled means for determining the speed of the motor during another portion of the cycles.

18. In a heat regulation system, one or more enclosed spaces to be heated within a desired temperature range, a source of heat, means for periodically producing flow of heat from the source to the spaces, means for predetermining the frequency of the heat flow periods, and thermostatic means responsive to changes in temperature within the spaces normally rendering the periodic means effective to produce periodic flows of heat arranged to cancel said periodic flows upon an increase in temperature in the spaces beyond the desired temperature range, the duration of the heat flow periods being established independently of the periodic means.

19. A heat regulating system comprising in combination, a reservoir containing a liquid arranged to be heated by a source of heat, means for periodically rendering the source effective to heat the liquid, a liquid source for supplying liquid to the reservoir normally rendered ineffective to supply the liquid thereto, and means controlled by the periodic means for rendering the liquid source effective to supply liquid to the reservoir solely during intervals when the heat source is ineffective to heat the liquid.

20. In a heat regulating system with one or more spaces to be heated, a liquid chamber for supplying heated vapors to the spaces, a burner for heating the chamber to convert the liquid into a vapor, a source of fuel, means for periodically supplying fuel from the source to the burner for heating the chamber, means controlled by the level of the liquid in the chamber for controlling the fuel supply means arranged to control the supply thereby from the source to the burner upon a predetermined lowering of the liquid level in the chamber, and means for annulling the control of the fuel supply means by the liquid level control means upon operation of the fuel supply means to effect a supply of fuel from the source to the burner.

21. In a heat regulating system, one or more spaces to be heated, a source of heat for heating the spaces, time interval means for effecting a supply of heat from the source to the spaces for substantially fixed periods of time alternately with annulling the supply for variable periods of time, and temperature controlled means controlling the time interval means for varying the time interval of the variable periods independently of the temperature of the spaces.

22. In a heat regulating system, one or more spaces to be heated, a source of heat for heating the spaces, time interval means arranged to effect a normal supply of the heat from the source to the spaces at spaced intervals, thermostatic means controlling the time interval means and affected by the temperature of space exterior to the heated spaces and arranged to vary the relative lengths of the heating intervals as compared with the spaces between intervals, and thermostatic means associated with the heated spaces and arranged to cancel the control of the first named thermostatic means upon an abnormal increase of the temperature within the spaces.

23. In a heat regulating system, one or more spaces to be heated, a source of heat for heating the spaces, time interval means arranged to intermittently supply heat from the source to the spaces, thermostatic means affected by the temperature of space exterior to the heated spaces and arranged to effect operation of the time interval means to intermittently supply normal heat to the spaces, such heat being controlled in response to the temperature variations of the exterior space, and thermostatic means associated with the heated spaces arranged to annul the control of the first named thermostatic means upon an abnormal increase of the temperature within the heated spaces.

24. In a heat regulating system, one or more spaces requiring the temperature thereof to be maintained within a desired normal temperature range during one portion of a day and within a subnormal temperature range during another portion of the day, the spaces being affected by variations in the outside temperature, a source of heat, thermostatic control means responsive to the outside temperature for varying the supply of heat from the source to the spaces in accordance with variations in temperature of the outside atmosphere for heating the spaces within the desired normal temperature range during one portion of the day, and clock operated means for reducing the variable heat supply by the control means for heating the spaces within the subnormal temperature range during another portion of the day.

25. In a heat regulating system, one or more spaces requiring the temperature thereof to be maintained within a desired normal temperature range during one portion of a day and within a subnormal temperature range during another portion of the day, the spaces being affected by variations in temperature of the outside atmosphere, a source of heat, thermostatic control means responsive solely to the outside atmosphere for varying the supply of heat from the source to the spaces in accordance with variations in temperature of the outside atmosphere for heating the spaces within the desired normal temperature range during one portion of the day, and clock operated means for reducing the variable heat supply by the control means for heating the spaces within the subnormal temperature range during another portion of the day.

26. In a heat regulating system, one or more spaces requiring the temperature thereof to be maintained within a desired normal temperature range, the spaces being affected by variation in temperature of the outside atmosphere, a source of heat, time interval mechanism for periodically supplying heat from the source to the spaces, and thermostatic control means responsive to temperature changes of the outside atmosphere arranged to control the time interval mechanism for varying the heat supply periods substantially in accordance with variations in the outside temperature during the heating of the spaces within the desired normal temperature range.

27. In combination, a source of heat, mechanism for intermittently controlling said source of heat, said mechanism being adjustable to cause its operation at time intervals of a length dependent upon the prevailing temperature, and clock operated mechanism for reducing the frequency of intervals of operation during a predetermined portion of the day.

28. Heat regulating means comprising a valve, mechanism for alternately opening and closing said valve at intervals, said mechanism being automatically adjustable to regulate the relative lengths of the periods during which the valve is opened and closed in accordance with prevailing temperatures, and means controlling said mechanism and automatically adjustable to vary the frequency of periods when the valve is opened, in accordance with the time of day.

29. In combination, a conduit for conducting a heating medium, means for alternately checking the flow of and releasing the fluid medium therethrough, and clock operated mechanism controlling said means for reducing the number of periods during which the fluid is released during predetermined hours of a day when only reduced heating is necessary but continuing the intermittent heat control.

30. In combination, a source of heat, means for thermostatically regulating the quantity of heat supplied from said source whereby the heat is supplied at a variable rate in accordance with prevailing outdoor temperatures, and clock operated mechanism for shifting the thermostatic heat control to a sub-normal or different temperature range during a predetermined portion of the day.

31. Apparatus for regulating a heat system comprising, a valve controlling the flow of heating medium to said system, electromagnetic operating means connected to control the operation of said valve, electrical energizing circuits for said operating means, a thermostatic element exposed to prevailing outside temperatures, means controlling said circuit connections and operatively associated with said element to be variably and gradually adjusted thereby in accordance with outside temperature changes, whereby said circuit connections and valve are variably controlled to control the effective rate of supply of the heating medium in accordance with outside temperatures, and clock control means associated with said circuit connections to control the same and said valve to effect controlled supply of the heating medium at a lesser rate during predetermined portions of a day.

32. In a heat regulating system, one or more enclosed spaces requiring the temperature therein to be maintained within a desired temperature range, the spaces being affected by variation in temperature of the outside atmosphere, a source of heat, and thermostatic means responsive to variations in temperature of the outside atmosphere for producing one predetermined supply of heat from the source to the spaces during variation in temperature of the outside atmosphere within one comparatively small temperature range and producing other predetermined heat supplies to the spaces during variation in temperature of the outside atmosphere within other comparatively small temperature ranges.

33. In a heat regulation system, one or more enclosed spaces requiring the temperature therein to be maintained within a desired temperature range, the spaces being affected by variation in temperature of the outside atmosphere, a source of heat, and thermostatic means responsive to variation in temperature of the outside atmosphere for producing one predetermined supply of heat from the source to the spaces during one temperature range comprising a predetermined divisional temperature range of the entire temperature range of the outside atmosphere to which the thermostatic means is responsive and producing other predetermined heat supplies during other predetermined divisional temperature ranges of the entire temperature range to which the thermostatic means is responsive.

34. In a heat regulation system, one or more enclosed spaces to be heated within a desired temperature range, a source of steam, time interval means for periodically effecting supply of steam from the source to the spaces for the heating thereof, and thermostatic means responsive to changes in temperature within the spaces normally rendering the time interval means effective to supply steam from the source when they are heated within the desired temperature range arranged to cancel supply of steam therebetween upon the heating of the spaces beyond the desired temperature range, the time interval of the steam supply periods being established independently of the operation of the time interval device.

35. In a heat regulation system, one or more spaces to be heated within a desired temperature range, steam radiators for heating the spaces, a source of steam, means including a time interval device for periodically producing flow of steam from the source to the radiators, and means including a pressure device responsive to the pressure of the steam normally rendering the time interval device effective to produce periodic flow of steam arranged to cancel the periodic flow upon an abnormal increase of pressure of the steam, the establishment of the steam flow periods by the time interval device being independent of the pressure device.

36. In combination, a source of heat, means including an electric circuit and a source of electrical energy therefor for controlling the flow of heat from the source, means for thermostatically regulating the flow of electrical energy in the circuit in accord with variation in temperature of the outside atmosphere, and means including a circuit controller for varying the degree of variable energy flow in the circuit independently of the variable flow therein produced by the thermostatic means whereby the variable heat flow will be of differing degrees during different portions of a day.

37. Heat regulation means comprising a valve in a heating fluid supply conduit, thermostatically regulated means for operating said valve to admit flows of the heating fluid in accordance with prevailing outdoor temperature changes, and mechanism cooperating with said regulated means to reduce the rate of supply of the heating fluid during a predetermined portion of the day.

38. In a heat regulation system, one or more spaces to be heated within a desired temperature range, a heating boiler for heating the spaces, a burner for heating the boiler, a source of fuel for the burner, means including a time interval device for periodically supplying fuel from the source to the burner, and means including a thermostat responsive to variation in temperature of the outside atmosphere for rendering the periodic fuel supply means effective to variably supply fuel to the burner in accordance with the variation in temperature of the outside atmosphere.

39. Apparatus for regulating the supply of steam to a heating system having a plurality of radiators located in rooms, the temperature of which is affected by variations in outdoor temperature, comprising time controlled means for intermittently supplying and interrupting a supply of steam to the radiator system in cycles, with the intervals of supply and interruption both normally substantially fixed in length for a given outdoor temperature, and thermostatically regulated means responsive to outdoor temperature changes for adjusting said control means to vary the relative lengths of the intervals of interruption as compared with the intervals of steam supply for producing one predetermined rate of steam supply during variation in outdoor temperatures within one comparatively small temperature range and producing other predetermined steam supplies respectively during variations in outdoor temperature within other comparatively small temperature ranges.

40. Apparatus for regulating the supply of steam to a heating system having a supply conduit connected to a plurality of radiators located in rooms, the temperature of which is affected by variations in outdoor temperature, comprising in combination with a source of steam, means for providing supplies of the steam to the radiator system during spaced intervals of time, including timing apparatus to normally determine both the duration of the intervals of supply and the spacing thereof, and thermostatically regulated means responsive to outdoor temperature changes for adjusting said timing apparatus to vary the relative length of said spacing as compared with the intervals of steam supply whereby during the heating of the rooms within a desired normal temperature range, the steam is supplied at a variable rate depending upon prevailing outdoor temperatures.

41. Apparatus for regulating the supply of steam to a heating system having a supply conduit connected to a plurality of radiators located in rooms, the temperature of which is affected by variations in outdoor temperature, comprising in combination with a source of steam, means for providing supplies of the steam to the radiator system during spaced intervals of time, including timing apparatus to normally determine both the duration of the intervals of supply and the spacing thereof, and thermostatically regulated means including electrical circuit connections responsive step-by-step to outdoor temperature changes for adjusting said timing apparatus to vary the portion of elapsed time devoted to the spacing of the intervals of steam supply, whereby one predetermined supply of steam is provided during one small temperature range comprising a predetermined division of the entire outdoor temperature range to which the thermostatic means is responsive, and other predetermined supplies of steam are provided respectively during other predetermined divisions of said entire outdoor temperature range.

42. Apparatus for regulating the supply of steam to a heating system having a supply conduit connected to a plurality of radiators located in rooms, the temperature of which is affected by variations in outdoor temperature, comprising in combination with a source of steam, means for providing supplies of the steam to the radiator system during spaced intervals of time, including timing apparatus to normally determine both the duration of the intervals of supply and the spacing thereof, thermostatic regulating means responsive to outdoor temperature changes for controlling said timing apparatus, whereby the steam is supplied at a variable rate depending upon prevailing outdoor temperatures, and clock operated means for modifying the action of said timing apparatus while still under control of said thermostatic means, whereby said variable rate is shifted to a predetermined extent during a predetermined portion of the day.

OSCAR A. ROSS.